United States Patent [19]
Homa

[11] Patent Number: 5,924,756
[45] Date of Patent: Jul. 20, 1999

[54] AIRFOIL FOR SPORT VEHICLES

[76] Inventor: Harry Homa, 1045 Bank St., Bridgeville, Pa. 15017

[21] Appl. No.: 09/093,236

[22] Filed: Jun. 8, 1998

[51] Int. Cl.$^6$ .................................................. B62D 35/00
[52] U.S. Cl. ........................................... 296/91; 296/180.1
[58] Field of Search .................................. 296/91, 180.1, 296/180.2

[56] References Cited

U.S. PATENT DOCUMENTS

| | | | |
|---|---|---|---|
| 2,184,798 | 12/1939 | Gracey | 296/91 |
| 2,930,650 | 3/1960 | Vosen | 296/91 |
| 3,862,777 | 1/1975 | Schifano | 296/91 |
| 4,063,773 | 12/1977 | Modesette | 296/91 |
| 4,142,758 | 3/1979 | Scaife | 296/91 |
| 5,039,156 | 8/1991 | Messmore et al. | 296/91 |
| 5,112,095 | 5/1992 | Lund et al. | 296/91 |
| 5,129,699 | 7/1992 | DeAngeli | 296/180.1 |
| 5,308,134 | 5/1994 | Stanesic | 296/91 |
| 5,403,059 | 4/1995 | Turner | 296/91 |
| 5,595,416 | 1/1997 | Horwill | 296/91 |

*Primary Examiner*—Joseph D. Pape
*Attorney, Agent, or Firm*—William L. Krayer

[57] ABSTRACT

An airfoil for a sports vehicle is mounted near the rear of the hood. It has several joined panels of various angles designed to direct the flow of air upwardly, and partially to the side, in front of the windshield. Details are shown for clips to fasten the airfoil to the hood.

7 Claims, 6 Drawing Sheets

AIRFOIL FOR SPORT VEHICLES

TECHNICAL FIELD

This invention relates to airfoils designed especially for attachment to sport vehicles.

BACKGROUND OF THE INVENTION

Many contemporary sport vehicles are built to angular designs, which tends to make them inefficient, particularly at higher speeds, because of wind resistance. While purchasers of the sports vehicles may like and admire the appearance of the vehicles, they are not necessarily content with the inefficient gasoline mileage resulting from the air resistance to the three-dimensional profiles of the vehicles.

Airfoils have been proposed for trains and trucks as well as automobiles and other types of vehicles. The passage of a vehicle through air has been studied extensively in wind tunnels and otherwise. Streamlining is an old art. But the application of airfoils to particular designs of sports vehicles has not received much attention, probably because of a general reluctance to modify the design of the sports vehicle and partly because of the variety of such vehicles, which have proliferated significantly in recent years. In addition, some airfoil designs simply are not very good at what they are supposed to do.

De Angeli, in U.S. Pat. No. 5,129,699, proposed a flat, tunnel like structure for the roof of an automobile, to provide a lifting force. This patent does not deal with the front of the automobile or, especially, the windshield, which may not be steeply sloped.

Messmore and Chabot, in U.S. Pat. No. 5,039,156, disclosed an insect shield for placement near the front of the hood of an automobile. The shield covers part of the downward-turning surface of the front of the hood, as well as providing a sloped surface to deflect insects and the like. This disclosure does not help the user who wants to be able to minimize the air resistance on the windshield and its environs.

There is a need for an efficient, portable (attachable) airfoil which one may place on a sports vehicle or similar vehicle, or an automobile, to achieve noticeable savings in energy while preserving the pleasant appearance of the vehicle.

SUMMARY OF THE INVENTION

I have invented a convenient, portable airfoil for attachment to a sports vehicle or other personal vehicle such as an automobile. It not only improves gasoline efficiency but also improves the handling of the vehicle, particularly at higher speeds.

The airfoil is inexpensively constructed of metal or a hard plastic preferably about 2–3 mm thick, preferably molded as a monolithic piece, comprising six defined wings or panels. It is held to the hood of the sports vehicle by clips grasping the underside of the hood nearest the windshield at the hood's interface with the other body parts of the vehicle. The wings or panels of the airfoil comprise a wide front panel, two side panels angled or flared backwardly at the ends of the wide front panel, and three top panels, one coextensive with the front panel and two each coextensive with the side panels. Although the airfoil is a few inches high, its top is still below the line of vision from a relatively high-seated driver to the front of the hood.

DETAILED DESCRIPTION OF THE INVENTION

Figure 1:
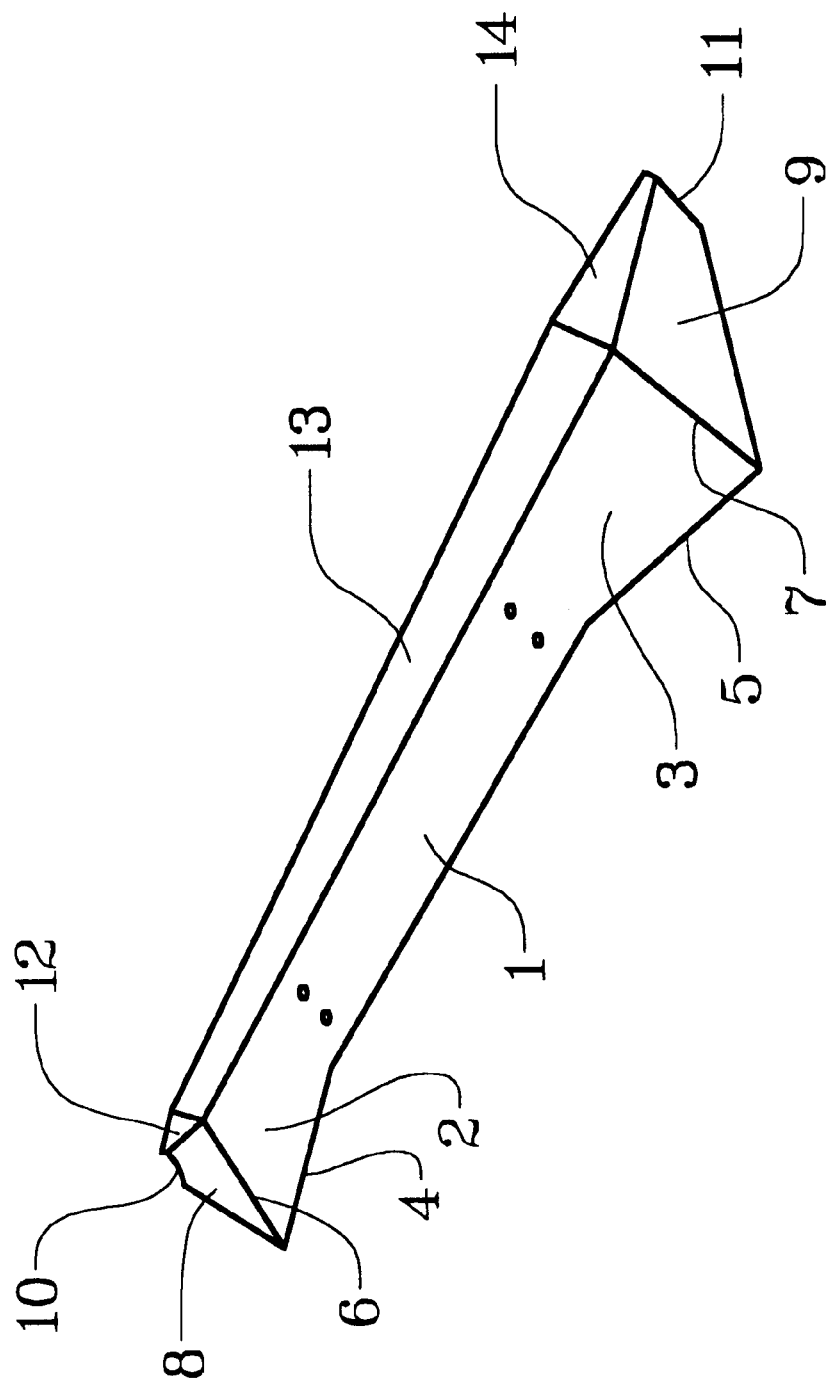
FIG. 1 is a perspective view of a preferred construction of my invention, showing the two side portions at different angles.

Referring first to FIG. 1, the front panel 1 has a narrow dimension of about six inches and is about 48 inches long at its bottom, including wider portions 2 and 3 defined by flared base edges 4 and 5, leading to side edges 6 and 7 having dimensions of about 8.5 inches. The side edges 6 and 7 are contiguous to side panels 8 and 9, which taper to trailing edges 10 and 11 of about two inches in height. Above the panels 1, 8, and 9 are top panels 12, 13, and 14, top panel 13 being contiguous to the full length of front panel 1. Because of the various angles of construction, the top edge of top panel 13 is longer than the bottom, i.e. it is about 49.25 inches in the preferred construction. As will be seen perhaps more clearly in FIGS. 2 and 4, front panel 1 will lie preferably at about a 40° angle from the plane of the hood, being attached to a mounting clip of the type described in FIG. 2. This angle may vary from about 25° to about 45°. Because of the large relatively planar parts of the airfoil, it lends itself well to vacuum molding as a single piece.

Figure 2:
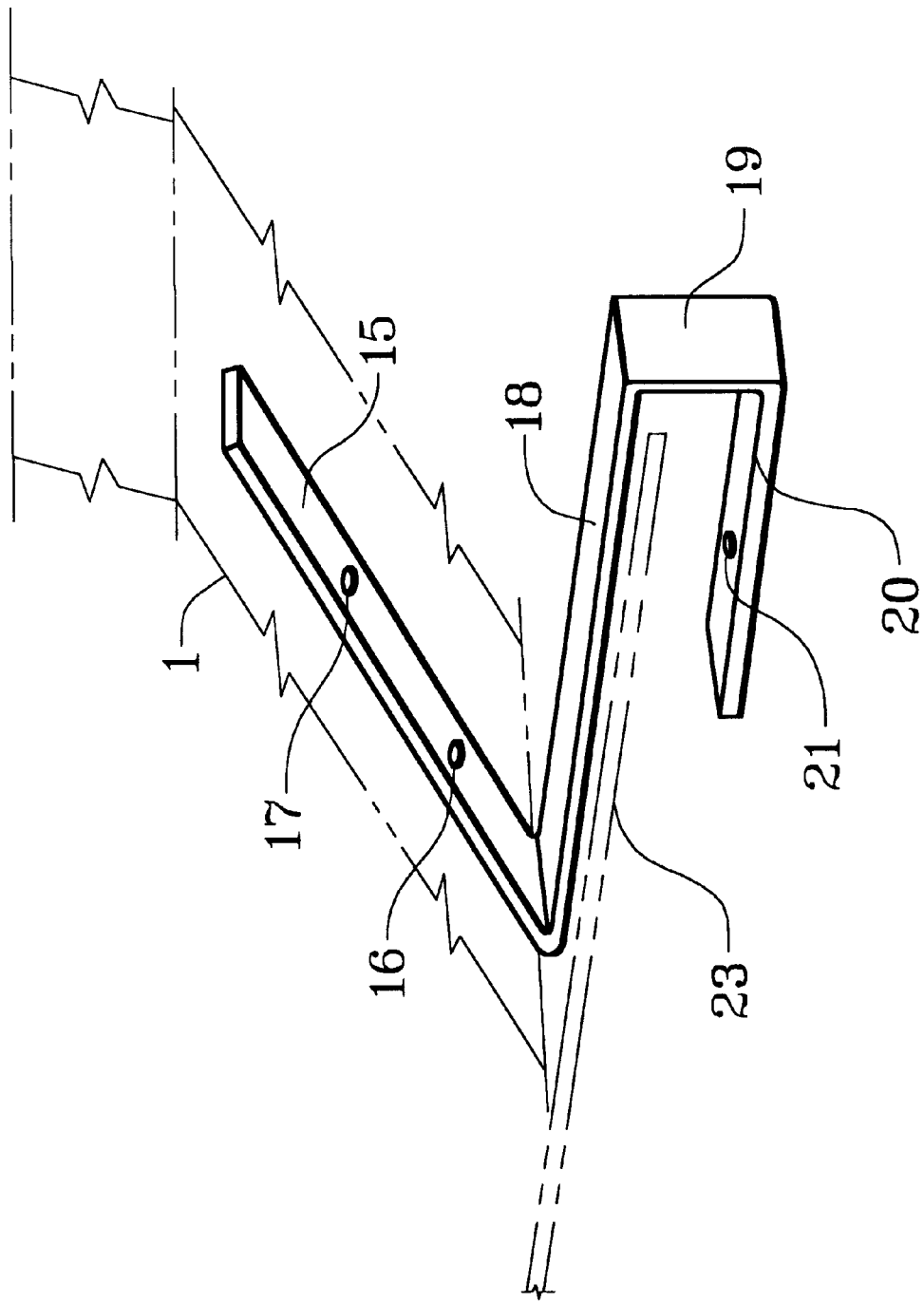
FIG. 2 is a perspective view of a clip for mounting the airfoil.

FIG. 2 shows a preferred mounting clip. The angled top portion 15 has holes 16 and 17 for bolts or other fasteners, base member 18 extending rearwardly from top portion 15, downwardly extending back 19, and forwardly extending clip member 20. Back 19 is about one inch in height; the clip member 20 should be at least about three inches, the base member 18 should be about 5 inches in length, and, to assure a good attachment, top portion 15 should be about 5 inches from base member 18 to its top. Two mounting clips of the type shown in FIG. 2 are recommended, although more could be used to be certain that the airfoil will not become dislodged from the vehicle. Dimensions may be varied somewhat for different makes and styles of vehicles, but the back 19 will generally be about an inch in height to assure that the back of the hood will fit into the area between the clip member 20 and base member 18. Hole 21 is provided for more or less permanent attachment to the hood, and holes 16 and 17 on the angled top portion 15 are to be used for the airfoil itself, specifically front panel 1.

Figure 3:
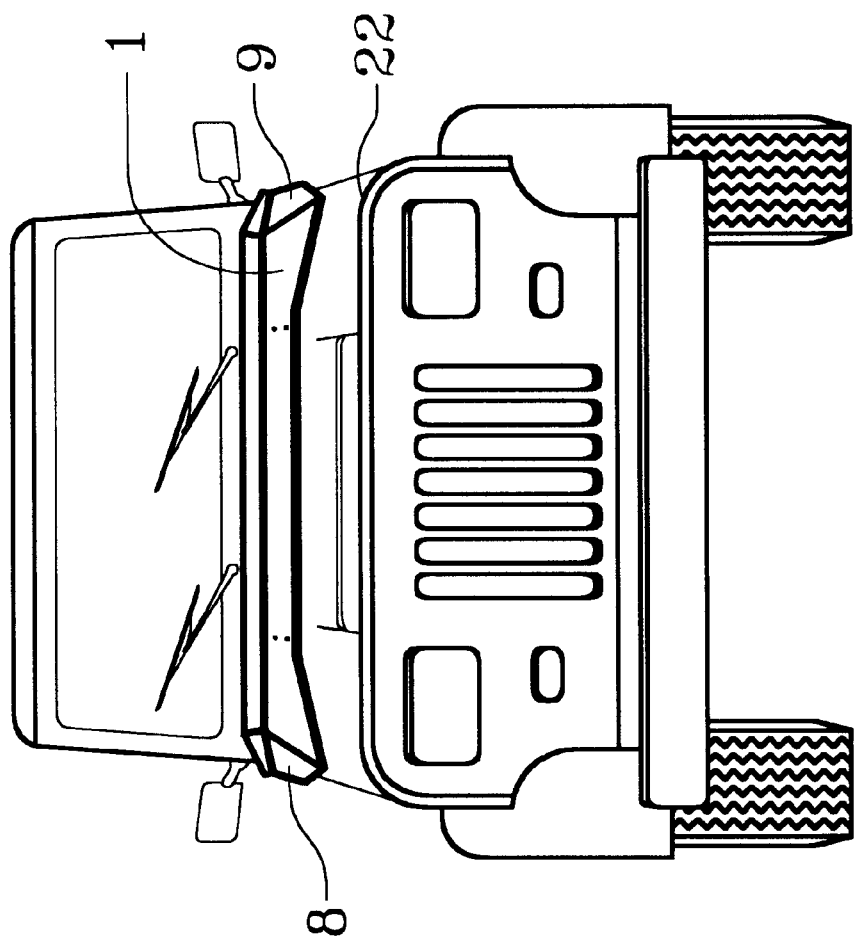
FIG. 3 is the front view of a sports vehicle with my airfoil.

In FIG. 3, it is seen that the airfoil extends across the full width of vehicle 22. The lower profile of panel 1 is designed to substantially follow the contour of the hood, and accordingly the lower profile may vary somewhat for custom fitting for various models and types of sports vehicles, small trucks, and other vehicles, particularly those having windshields set at high angles from the horizontal. Side panels 8 and 9 do not overhang.

Figure 4:
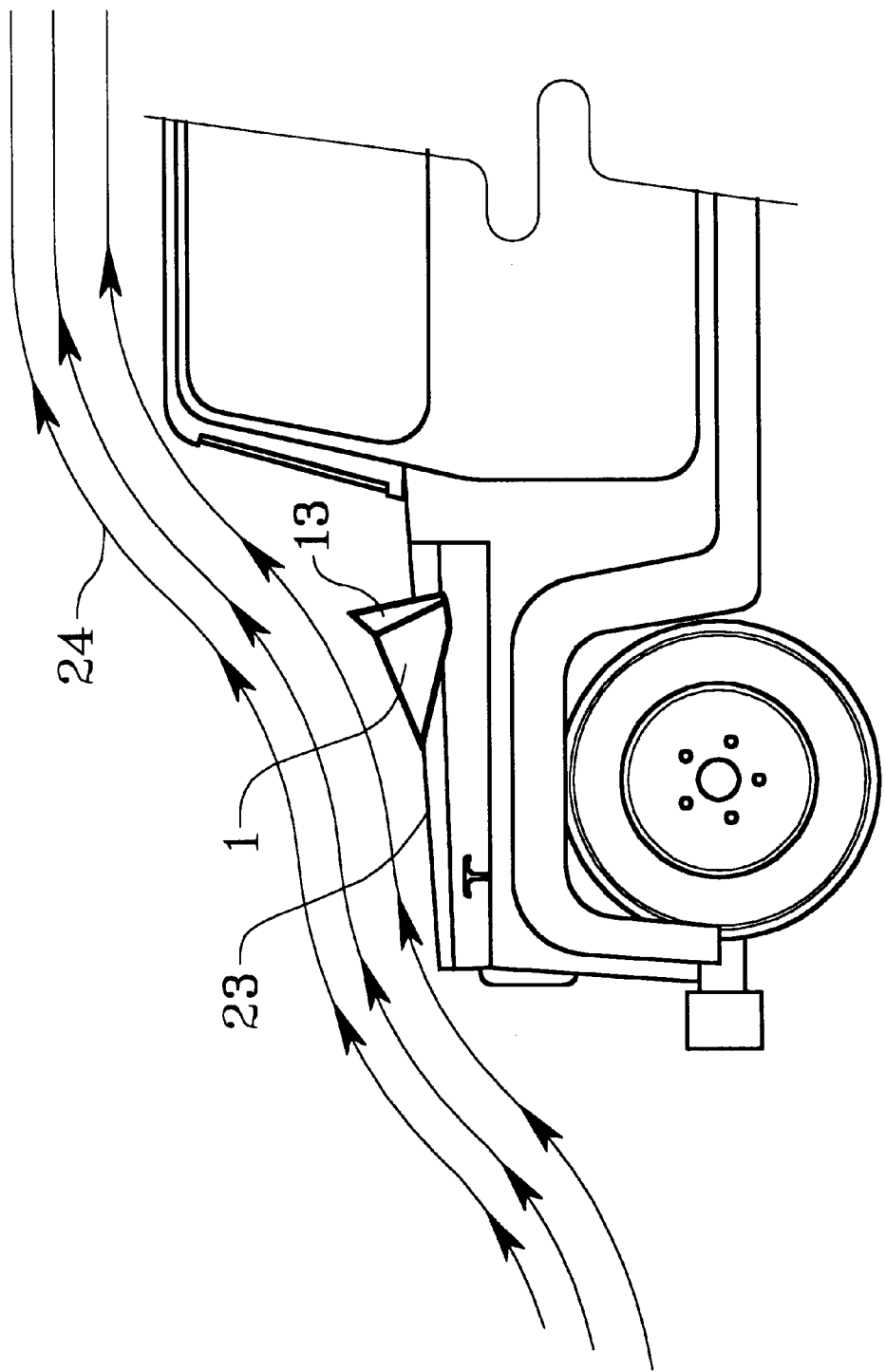
FIG. 4 is a side view of a portion of a sports vehicle equipped with my airfoil.

FIG. 4 emphasizes that the unit is mounted at or near the rear of the hood 23. Its front should be about 10 to about 13 inches from the base of the windshield. It is also seen more clearly here that top panel 13 is raised at an angle from that of the front panel 1, i.e. of about 23° from the plane of panel 1, although this angle may range from about 18° to about 30°. At speeds over about 40 miles per hour, air currents follow the pattern of arrows 24, as has been demonstrated in a wind tunnel.

Figure 5:
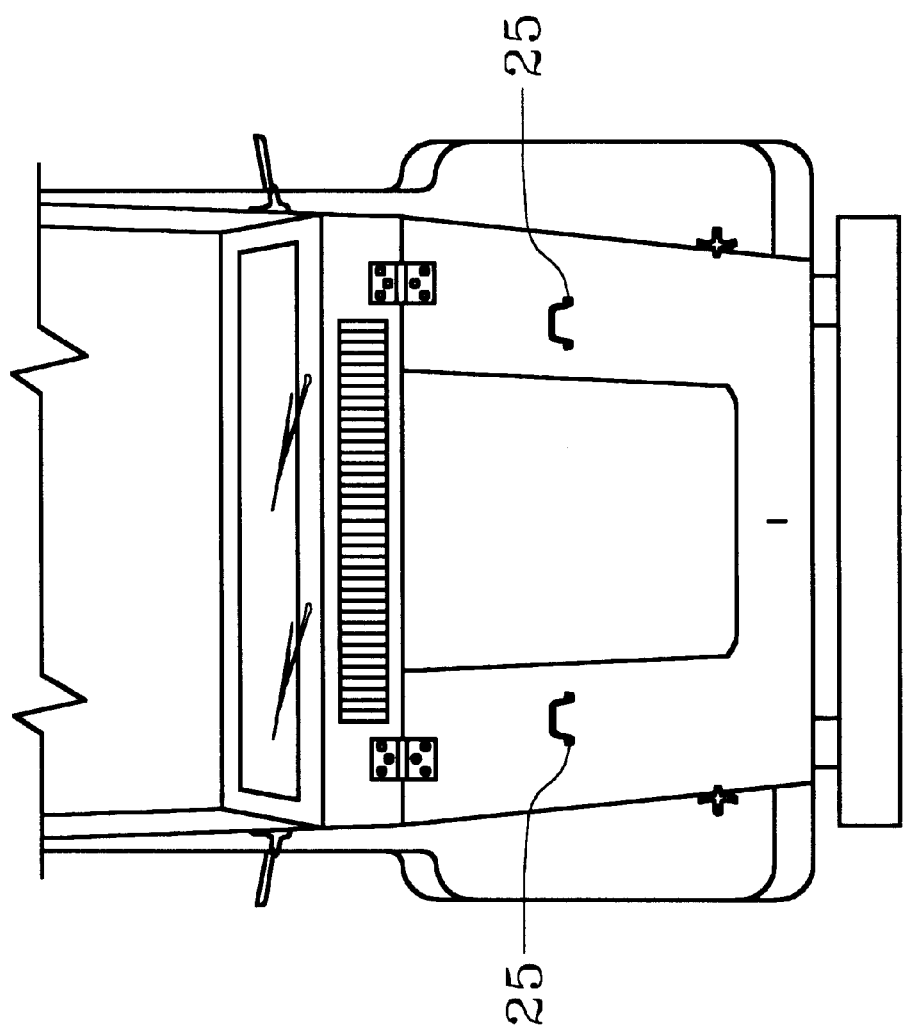
FIG. 5 is an overhead view of the front of a vehicle having hood bumbers.
Figure 6:
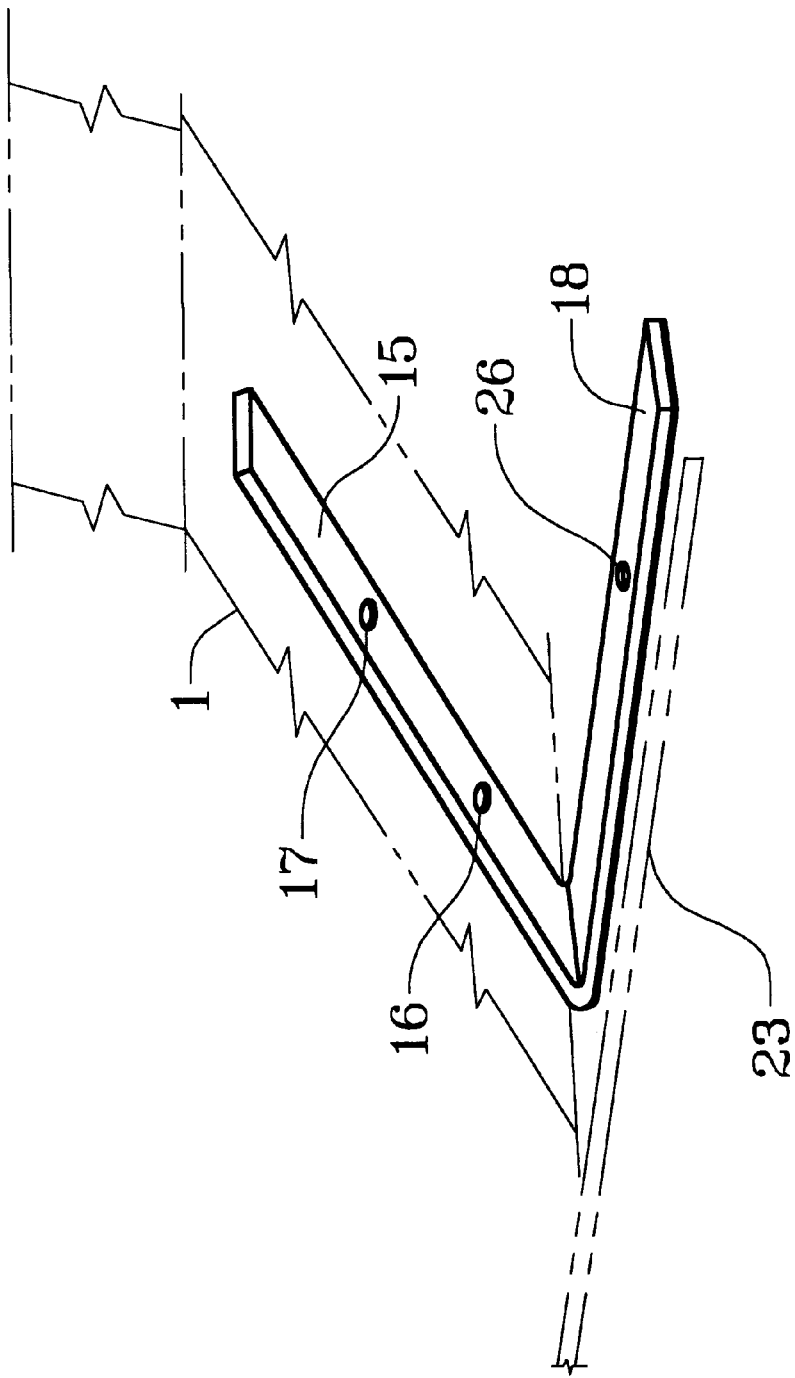
FIG. 6 is a variation of a fastener for securing my airfoil to a vehicle.

FIG. 5 shows hood bumpers 25 which may be removed to make the holes in the hood available for the attachment of the clip variants of FIG. 6. The clip of FIG. 6 is similar to that of FIG. 2 in that it has a top portion 15 with holes 16 and 17 for fastening to panel I of the airfoil, and base member 18. Hole 26 may be juxtaposed over the holes left by the removal of hood bumpers 25 (FIG. 5) so the clip may be fastened to hood 23.

Gas mileage comparisons were made on a 1994 Jeep Wrangler YJ having a 2.5 liter, 4-cylinder engine and a 5-speed transmission. Without the airfoil, the average mileage over a two year period in mostly suburban and highway travel was 14 miles per gallon of gasoline. Mileage efficiency records were also kept for experimental designs of the invention as follows:

| Experimental Design #1 | | |
| --- | --- | --- |
| Miles | Gallons | Miles per gallon |
| 213 | 13 | 16 |
| 214 | 14 | 15 |
| 208 | 13 | 16 |
| 214 | 11 | 16 |
| 212 | 12 | 18 |
| 195 | 14 | 14 |
| 231 | 12 | 19 |

This resulted in a composite average of 17 miles per gallon.

Using the same vehicle, experimental design #2's recorded efficiency was

| Experimental Design #2 | | |
| --- | --- | --- |
| Miles | Gallons | Miles per gallon |
| 182 | 9 | 20 |
| 232 | 13 | 18 |
| 209 | 12 | 17 |
| 239 | 12 | 19 |
| 187 | 10 | 19 |

Average of the above mileage records is 19 miles per gallon.

The difference in construction between experimental designs 1 and 2 was that #1 did not have top panels such as top panels 12, 13, and 14. I therefore consider top panel 13 essential to obtain the kind of mileage results shown in the second table above.

My airfoil need not be constructed exactly as depicted. For example, the front panel 1 need not be built in an exactly flat plane, but may have a slight convex curve; if so, the top panel 13 will still be contiguous to it, but may also curve. Likewise, the exact angles and dimensions stated herein for the preferred embodiment are understood to be discretionary and may be customized for various models of sports or other vehicles.

I claim:

1. An airfoil for a vehicle having a hood and a windshield, comprising (a) a substantially flat front panel for placement on the rear of a vehicle hood at an upwardly and rearwardly directed angle of about 25° to about 45° from the plane of said hood, (b) side panels on each end of said front panel for placement on said hood to flare rearwardly therefrom, (c) top panels above each of said front and side panels, said top panels being angled upwardly more steeply than said front and side panels, and (d) at least two clamps for fastening around the rear edge of said hood.

2. An airfoil of claim 1 wherein said upwardly and rearwardly directed angle for placement of said front panel from the plane of said hood is about 40°.

3. Airfoil of claim 1 wherein said clamps include U-shaped recesses for receiving said edge of said hood.

4. Airfoil of claim 1 wherein said side panels flare rearwardly from said front panel at an angle of about 45°.

5. A vehicle including a hood and a windshield, said hood having a rear edge, said vehicle including an airfoil comprising (a) a substantially flat front panel attached to said rear edge of said hood to orient said front panel at an upwardly and rearwardly directed angle of about 25° to about 45° from the plane of said hood, (b) side panels on each end of said front panel flaring rearwardly therefrom, (c) top panels above each of said front and side panels, said top panels being angled upwardly more steeply than said front and side panels, and (d) at least two clamps attaching around the rear edge of said hood, said clamps having U-shaped recesses for receiving said edge of said hood.

6. A vehicle of claim 5, wherein said U-shaped recesses of said clamps have upper surfaces which form base members for said clamps to secure said airfoil to said hood.

7. A vehicle of claim 5 wherein said substantially flat panel is placed about 10 to about 13 inches from said windshield.

* * * * *